INVENTORS
Russell N. Cressman
John P. Hoffman

INVENTORS
Russell N. Cressman
John P. Hoffman

United States Patent Office 3,394,303
Patented July 23, 1968

3,394,303
EDDY CURRENT INSPECTION APPARATUS
AND METHOD OF CALIBRATING
Russell N. Cressman, Allentown, and John P. Hoffman,
Coopersburg, Pa., assignors to Bethlehem Steel Corporation, a corporation of Delaware
Filed Aug. 10, 1965, Ser. No. 478,639
5 Claims. (Cl. 324—40)

ABSTRACT OF THE DISCLOSURE

Eddy current inspection apparatus is calibrated by providing a low frequency oscillator, previously calibrated by means of artificial defects, which modulates the high frequency current supplied to the testing coil with a continuous defect-simulating signal.

Figures 1, 2:
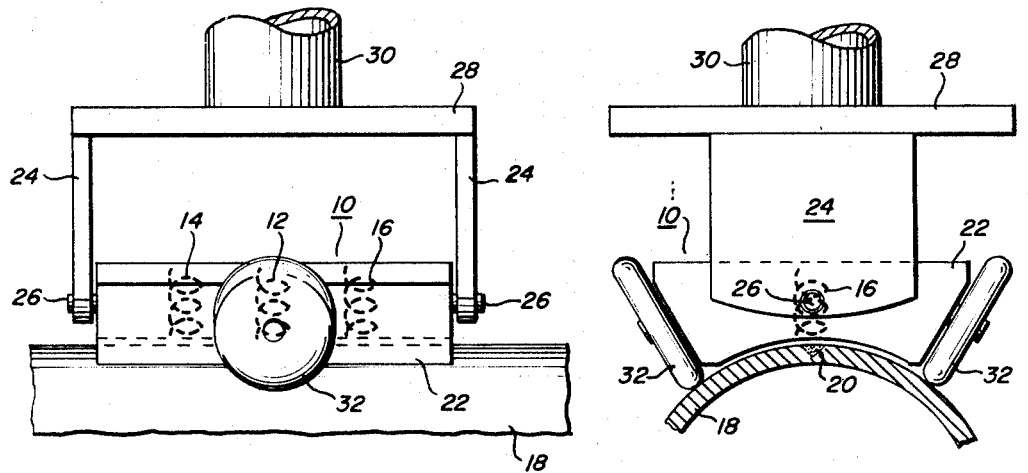

This invention relates to an apparatus and method for detecting anomalies in conductive material, and more particularly to an apparatus and method in which such anomalies are detected by means of eddy currents induced in said material.

Eddy current apparatus, in order to accurately inspect material for anomalies therein, e.g. blow holes in the weld area of steel pipes, must be calibrated to a known sensitivity level so that gross defects will be detected while defects of a minor nature will not.

Often the difference between a signal caused by a gross defect and that caused by a minor, or acceptable defect, is very small. Therefore, only slight changes in the sensitivity level of the eddy current apparatus can result in unacceptable material passing inspection or acceptable material being rejected.

In general, the sensitivity level of present eddy current apparatus changes during the course of testing. Factors which affect the sensitivity level are, for example, (a) changes in the degree of electromagnetic coupling between the material being inspected and the test coils of the apparatus; (b) changes in the parameters (drifting) of the electrical components of the apparatus; and (c) changes in the chemical and/or metallurgical properties of the material being inspected.

In view of the foregoing, it is necessary to establish a known sensitivity level and periodically check said level during the course of a test.

In the past, eddy current apparatuses were calibrated in one of two ways. One way comprised using standard materials containing a natural defect of known characteristics. The second way comprised introducing a simulated defect, e.g. a drill hole, into the material being tested.

Both of these methods were difficult to use in continuous production facilities. In addition, the first method failed to take into consideration chemical and/or metallurgical differences between the standard and the material under test. Further, the storage of standards was cumbersome. The second method was disadvantageous in that the introduction of a defect into an otherwise satisfactory material ruined said material. In both methods, the defect signal occurred but once, thus making calibration difficult.

It is an object of the present invention to provide an eddy current apparatus in which a known sensitivity level can be established and maintained without the use of standard materials and without the need to introduce a defect into the material under test.

It is a further object to provide an apparatus in which a continuous defect-simulating signal may be used for calibration purposes.

An additional object is to provide a method for calibrating eddy current apparatus.

We have discovered that the foregoing objects can be attained by providing a coil assembly, electromagnetically coupled to the test material during calibration, means for modulating the testing current with a continuous low frequency signal, and means for varying the degree of modulation of said testing current whereby defect signals are accurately electrically simulated.

Figure 3:
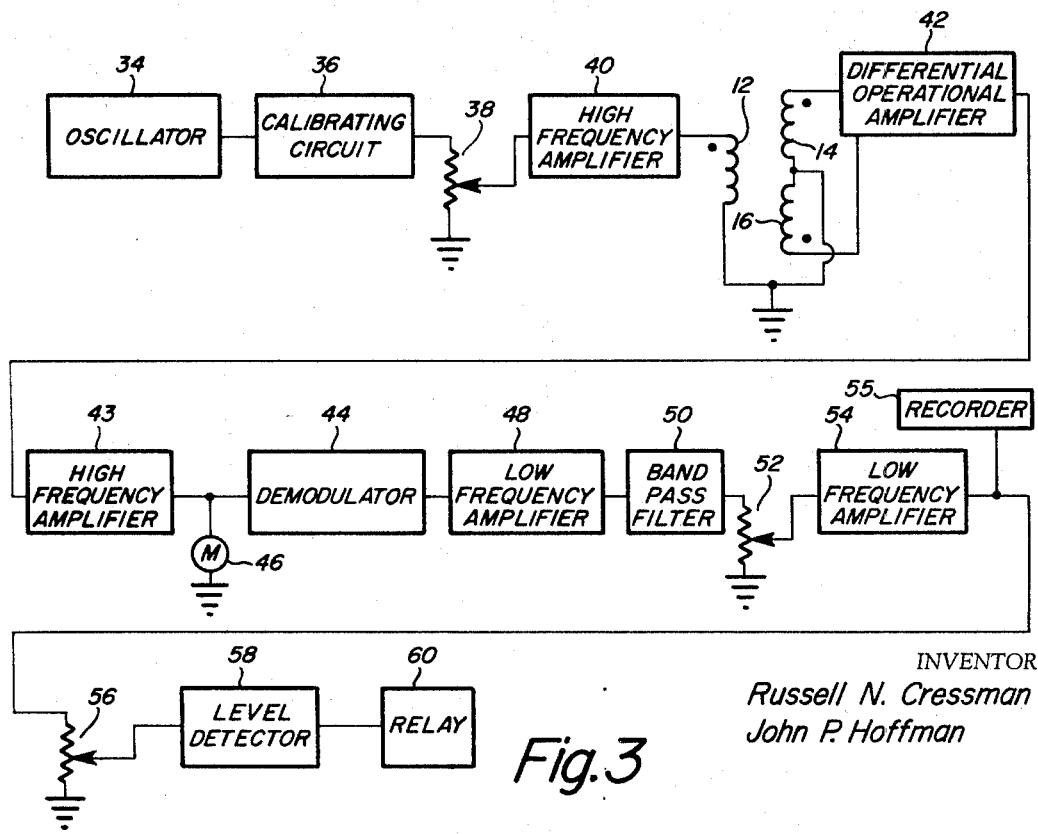
Figure 4:
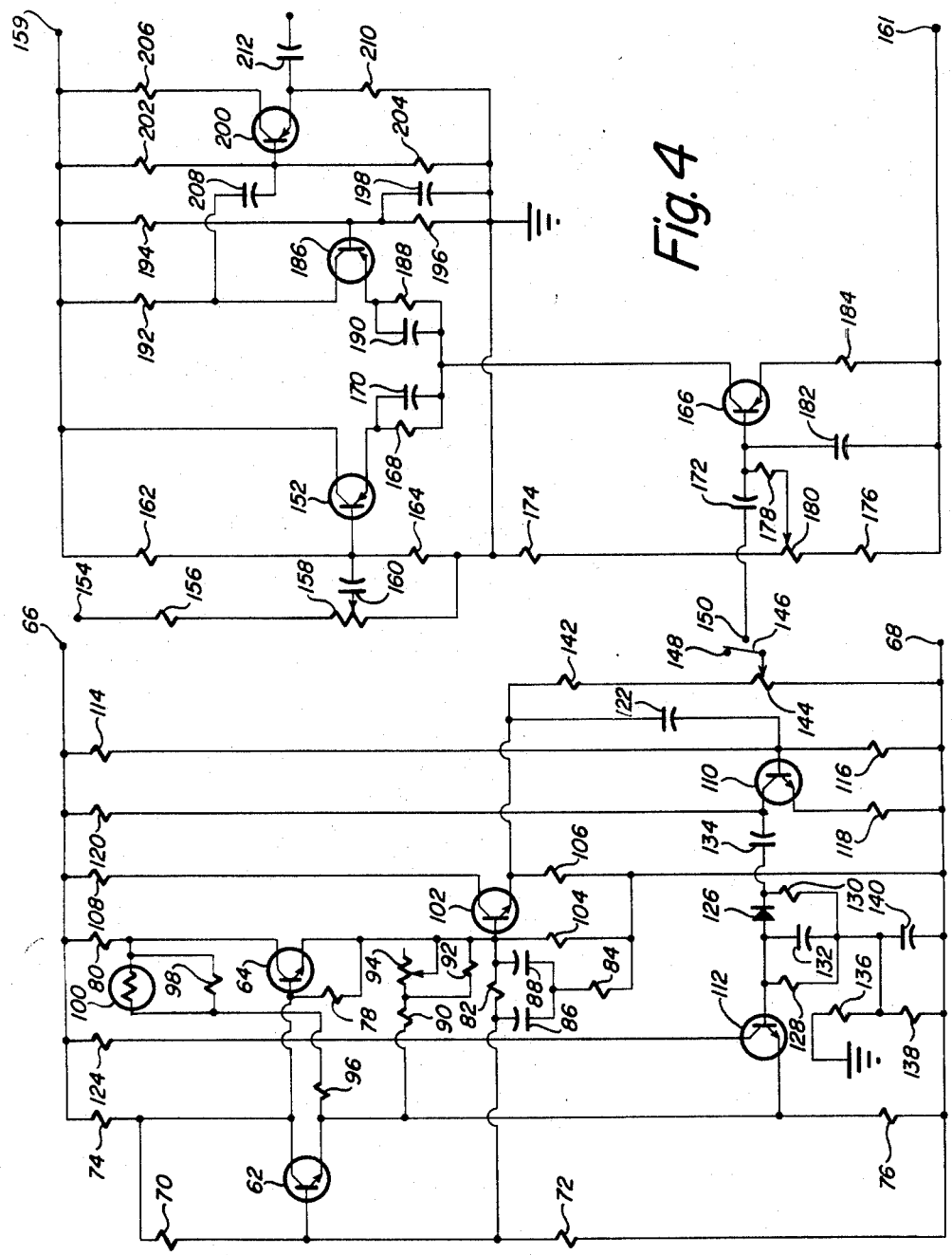

Referring to the drawings,
FIGURES 1 and 2 are diagrammatic views of a typical test coil assembly in its normal position relative to a pipe being inspected.
FIGURE 3 is a block diagram of the circuits of the invention.
FIGURE 4 is a schematic diagram of the calibrating section of FIGURE 3.

As is shown in FIGURES 1 and 2, the eddy current apparatus of the invention comprises a coil assembly 10 comprising a drive coil 12 and first and second pick-up coils 14 and 16. Said pick-up coils are differentially connected, i.e. connected so that the voltages across them are in opposition. In addition, said pick-up coils are unbalanced, whereby the voltage across one coil always exceeds that across the other. This unbalance may be obtained by providing one pick-up coil with a greater number of turns than the other pick-up coil, or by varying the electromagnetic coupling between the pick-up coils and the drive coil.

The pick-up coils 14 and 16 are disposed on opposite sides of the drive coil 12, said pick-up coils and drive coil being aligned with the path of the material being inspected. In FIGURES 1 and 2, said material comprises a steel pipe 18, having a welded seam 20, adapted to move rectilinearly relative to said eddy current apparatus. The axes of the coils are perpendicular to the surface of said pipe.

The coil assembly 10 is mounted in a housing 22 which is rotatably mounted in trunnions 24 by means of pins 26. The trunnions are connected to a plate 28 which may be raised or lowered by the shaft 30. The housing 22 is provided with wheels 32 which ride along the surface of the pipe 18.

The electrical circuits of the invention are shown in block diagram form in FIGURE 3. An oscillator 34 provides a high frequency alternating current source which supplies current to the drive coil 12. By reason of the unbalance of the pick-up coils 14 and 16, a net unbalance voltage appears across the output of said pick-up coils. When a defect passes under said pick-up coils, said defect modulates said voltage. In the instant case, the signal induced by the defect has a frequency of about five to fifty cycles per second.

The frequency of the oscillator 34 should be equal to or greater than that of the defect signal, and by the term "high frequency," we wish to include such frequencies. Preferably, said high frequency is between 2 kc. and 20 kc.

The oscillator is connected to a calibrating circuit 36, the operation of which will be described in detail later in the specification. Broadly, the calibrating circuit comprises means for generating a low frequency, e.g., 5 c.p.s., sinusoidal signal and contains means for amplitude modulating the high frequency current, by varying degrees, with said low frequency signal. As will be clear from the following description, the exact low frequency to be generated is dependent upon the speed of the material to be inspected and the dimensions of the coil assembly.

The calibrating circuit is connected to control means, e.g. a potentiometer 38, the purpose of which is to control the amplitude of the signal supplied to the drive coil 12. Said signal is supplied through a high frequency amplifier 40 to said drive coil.

The pick-up coils 14 and 16 are connected to a differential operational amplifier 42 which converts the signals supplied thereto by the pick-up coils into a single signal representative of the difference in voltage across said coils. Said signal is amplified by a high frequency amplifier 43 and demodulated by a demodulator 44.

Connected between said amplifier 43 and said demodulator 44 is indicating means, comprising a meter 46, which indicates the magnitude of the differential output signal of said coil assembly.

The signal passes from the demodulator 44 through a low frequency amplifier 48 to a band pass filter 50, which is designed to pass only low frequencies such as those generated in the calibrating circuit 36.

The filter 50 is connected to utilization means comprising a sensitivity control 52, a low frequency amplifier 54, a recorder 55, a threshold control 56, a level detector 58, and a relay 60. The relay 60 may be connected to a marking device which automatically marks defective material.

With the exception of the calibrating circuit 36, all of the foregoing circuits are of standard design and will not be described in detail hereinafter.

The calibrating circuit 36, which is shown in detail in FIGURE 4, broadly comprises a low frequency oscillator and a modulator. The low frequency oscillator comprises transistors 62 and 64. D.C. power is supplied to the oscillator by sources 66 and 68. Said transistors 62 and 64 are directly coupled, the base of transistor 64 being connected to the collector of transistor 62. Base bias is supplied to transistor 62 by means of a divider network consisting of resistors 70 and 72. Resistor 74 provides a load for transistor 62, and variable emitter bias is provided by means of resistor 76. Transistor 64 is biased by resistor 78 and is provided with a load resistor 80.

The oscillator frequency is determined by a bridged T network consisting of resistors 82 and 84 and capacitors 86 and 88. Said bridged T network, which is connected between the emitter of transistor 64 and the base of transistor 62, provides negative D.C. feedback at all frequencies except the desired oscillation frequency, which may be 5 cycles per second.

Linear operation of said low frequency oscillator is maintained by providing a positive D.C. feedback network consisting of resistors 90 and 92 and potentiometer 94 connected between the emitters of transistors 62 and 64. Oscillations of constant amplitude may be obtained by adjusting potentiometer 94.

A third feedback network is provided to compensate for variations in circuit parameters caused by temperature changes. Said network consists of resistor 96 connected in series to the parallel combination of resistor 98 and thermistor 100. Said network is connected between the collector of transistor 64 and the emitter of transistor 62.

Transistor 102 is provided to isolate the low frequency oscillator from load variations. Said transistor is biased by resistors 104 and 106 and is provided with load resistor 108.

A fourth feedback network comprises transistors 110 and 112. Transistor 110 is biased by resistors 114, 116 and 118 and is provided with a load resistor 120. The signal from transistor 102 is coupled to the base of transistor 110 by a capacitor 122.

Transistor 112 is provided with a load resistor 124 and is connected to a rectifying network consisting of a diode 126, resistors 128 and 130, and a capacitor 132. Said rectifying network is coupled to transistor 110 by a capacitor 134.

The input to the base of transistor 112 consists of a D.C. control voltage from the rectifying network and a fixed D.C. bias voltage from a divider network consisting of resistors 136 and 138. A by-pass capacitor 140 is also provided.

Changes in the emitter current of transistor 112 directly affect the gain of transistor 62 and therefore the amplitude of the output of the low frequency oscillator.

The output of transistor 102 is supplied to a divider network consisting of resistor 142 and potentiometer 144. The potentiometer 144 is connected to a switch 146 having two positions. During testing, the switch is in position 148, while during calibration the switch is in position 150.

The modulator portion of the calibrating circuit comprises a transistor 152. The high frequency eddy current signal is supplied to transistor 152 from point 154 through a divider network consisting of resistor 156 and potentiometer 158. The signal is coupled to the base of transistor 152 by a capacitor 160.

D.C. power is supplied to the modulator by sources 159 and 161.

Transistor 152 is provided with base bias by a divider network consisting of resistors 162 and 164. Transistor 152 functions as an emitter follower with the collector to emitter impedance of a transistor 166 acting as its load. The purpose of transistor 152 is to provide a high frequency carrier signal across the collector to emitter impedance of transistor 166. The emitter of transistor 152 is provided with a stabilizing resistor 168 and a by-pass capacitor 170.

The signal from the low frequency oscillator is coupled to the base of transistor 166 by a capacitor 172. Said base is provided with bias by a divider network consisting of resistors 174, 176 and 178 and potentiometer 180. Said base is also connected to a by-pass capacitor 182. The emitter of transistor 166 is stabilized by a resistor 184.

A transistor 186 is connected to the collector of transistor 166 through an emitter stabilizing the resistor 188 connected in parallel with a by-pass capacitor 190. Resistor 192 provides transistor 186 with its load. The base of transistor 186 is biased by a divider network consisting of resistors 194 and 196, the latter resistor being provided with a by-pass capacitor 198.

The output stage comprises a transistor 200 provided with bias by resistors 202, 204 and 206. The signal from transistor 186 is coupled to transistor 200 by a capacitor 208. The load is taken across resistor 210 by a capacitor 212.

Prior to testing, it is essential that the calibrating circuit be calibrated. Said calibration is accomplished substantially as follows.

The coil assembly is positioned on a magnetically saturated pipe, of known composition and dimensions, containing a simulated defect, e.g. a drill hole. The simulated defect is of a size such that the signal produced thereby is equivalent to the electrical signal produced by the largest acceptable defect. Typically, the coil assembly may be about 0.020 to 0.030 inch above the surface of the pipe.

The switch 146 is then positioned at position 148, and the control means 38 is varied until the indicating means 46 indicates a predetermined value, e.g. 100 microamperes.

The pipe is then moved, relative to the coil assembly 12, at the same velocity as during the actual inspection. The signal caused by the drill hole is recorded by the recorder 55.

The switch 146 is then positioned at position 150, and the potentiometer 144 is varied until the recorder 55 records a signal of the same amplitude as that of the drill hole signal. The position of the potentiometer is noted for future reference.

The above procedure is repeated for each substantially dissimilar type, size, etc. of material to be tested, and records are kept of the potentiometer 144 positions. Thus, after initially calibrating the calibrator, the eddy current apparatus may be calibrated without resorting to materials containing natural or artificial defects.

The eddy current apparatus is calibrated substantially as follows. First, the coil assembly 12 is electromagnetically coupled to the material to be inspected, said material being magnetically saturated. Next, the control means 38 is adjusted until the indicating means 46 indicates the same value as during calibration of the calibrator, e.g. 100 microamperes. The potentiometer 144 is then set at that position which, during calibration of the calibrator, resulted in an electrical signal equal in amplitude to the signal caused by the drill hole in a material the same as, or similar to, the material to be inspected. Calibration of the eddy current apparatus is completed by varying the level control 56 until the level at and above which the relay 60 is actuated substantially equals the amplitude of the signal supplied to the level detector 58.

The instant invention provides an apparatus and method in which, after initially calibrating the calibrator, a known sensitivity level can be established and maintained without the use of standard materials and without the need to introduce a defect into the material under test. In addition, the calibrator produces a continuous defect-simulating signal, thereby facilitating calibration.

We claim:

1. In apparatus for detecting anomalies in a conductive material,
   (a) a source of high frequency alternating current,
   (b) first circuit means, connected to said source, adapted to modulate said alternating current with a continuous low frequency signal, said first circuit means including means for varying the degree of modulation of said alternating current,
   (c) second circuit means, comprising a coil assembly electromagnetically coupled to said material, for inducing eddy currents in said material and containing an output signal therefrom,
   (d) means, connected to said first circuit means, for varying the amplitude of the current supplied to said coil assembly,
   (e) means, connected to means (c), for demodulating said output signal, and
   (f) utilization means, connected to means (e), for producing an output signal when the demodulated signal supplied thereto equals or exceeds a particular level, said utilization means including means for varying said level.

2. In apparatus for detecting anomalies in a conductive material,
   (a) a source of high frequency alternating current,
   (b) first circuit means, connected to said source, adapted to amplitude modulate said alternating current with a continuous low frequency signal, said first circuit means including means for varying the degree of modulation of said alternating current,
   (c) second circuit means, comprising a coil assembly electromagnetically coupled to said material, for inducing eddy currents in said material and obtaining a differential output signal therefrom,
   (d) control means, connecting said first circuit means to said second circuit means, for varying the amplitude of the current supplied to said coil assembly,
   (e) indicating means, connected in circuit with the output of said second circuit means, for indicating the magnitude of said differential output signal,
   (f) means, connected to means (c), for demodulating said output signal, and
   (g) utilization means, connected to means (f), for producing an output signal when the demodulated signal supplied thereto equals or exceeds a particular level, said utilization means including means for varying said level.

3. In apparatus for detecting anomalies in a conductive material which moves rectilinearly relative to said apparatus,
   (a) a source of high frequency alternating current,
   (b) first circuit means, connected to said source, adapted to amplitude modulate said alternating current with a continuous low frequency sinusoidal signal, said first circuit means including means for varying the percentage modulation of said high frequency alternating current,
   (c) second circuit means, comprising a coil assembly electromagnetically coupled to said material, for inducing eddy currents in said material and obtaining a differential output signal therefrom,
   (d) said coil assembly comprising a drive coil, to which said high frequency alternating current is supplied, and first and second unbalanced differentially-connected pick-up coils disposed on opposite sides of said drive coil, said drive coil and pick-up coils being aligned with the path of said material and having their axes perpendicular thereto,
   (e) control means, connecting said first circuit means to said drive coil, for varying the amplitude of the alternating current supplied to said drive coil,
   (f) indicating means, connected in circuit with said pick-up coils, for indicating the magnitude of said differential output signal,
   (g) means, connected to means (c), for demodulating said output signal, and
   (h) utilization means, connected to means (g), for producing an output signal when the demodulated signal supplied thereto equals or exceeds a particular level, said utilization means including means for varying said level.

4. In apparatus for detecting anomalies in a conductive material which moves rectilinearly relative to said apparatus,
   (a) a source of high frequency alternating current,
   (b) a source of low frequency sinusoidal current,
   (c) modulating means connected to said source of high frequency alternating current,
   (d) means, adapted to connect means (b) to means (c) whereby said high frequency current is modulated by said low frequency current, including means for varying the degree of modulation of said high frequency alternating current,
   (e) circuit means, comprising a coil assembly electromagnetically coupled to said material, for inducing eddy currents in said material and obtaining a differential output signal therefrom,
   (f) said coil assembly comprising a drive coil, to which said high frequency alternating current is supplied, and first and second unbalanced differentially-connected pick-up coils disposed on opposite sides of said drive coil, said drive coil and pick-up coils being aligned with the path of said material and having their axes perpendicular thereto,
   (g) control means, connecting said modulating means to said drive coil, for varying the amplitude of the high frequency alternating current supplied to said drive coil,
   (h) indicating means, connected in circuit with said pick-up coils, for indicating the magnitude of said differential output signal,
   (i) means, connected to means (e), for demodulating said output signal, and
   (j) utilization means, connected to means (i) for producing an output signal when the demodulated signal supplied thereto equals or exceeds a particular level, said utilization means including means for varying said level.

5. A method for calibrating apparatus for detecting anomalies in a conductive material, which apparatus comprises utilization means and a coil assembly having a drive coil and pick-up means, said method comprising:
   (a) electromagnetically coupling said coil assembly to said material,
   (b) supplying a high frequency alternating current to said drive coil,
   (c) adjusting the magnitude of said current until the signal across said pick-up means is at a predetermined level, (d) modulating the current supplied to said drive coil, by a predetermined degree, with a continuous low frequency signal,
(e) demodulating the current across said pick-up means,
(f) supplying the demodulated current to utilization means adapted to be actuated when the level of said demodulated current equals or exceeds a predetermined level, and
(g) varying said utilization means until the level at and above which it is actuated is substantially equal to the level of the demodulated current supplied thereto.

References Cited
UNITED STATES PATENTS
2,948,848   8/1960   Arnelo _____ 324—37

RUDOLPH V. ROLINEC, *Primary Examiner.*

P. A. URIBE, *Assistant Examiner.*

UNITED STATES PATENT OFFICE
CERTIFICATE OF CORRECTION

Patent No. 3,394,303                                     July 23, 1968

Russell N. Cressman et al.

It is certified that error appears in the above identified patent and that said Letters Patent are hereby corrected as shown below:

Column 5, line 31, "containing" should read -- obtaining --.

Signed and sealed this 13th day of January 1970.

(SEAL)
Attest:

Edward M. Fletcher, Jr.
Attesting Officer

WILLIAM E. SCHUYLER, JR.
Commissioner of Patents